US012694348B2

(12) United States Patent
Wu et al.

(10) Patent No.: US 12,694,348 B2
(45) Date of Patent: Jul. 28, 2026

(54) TASK PARTICIPANT ADDING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Danni Wu, Beijing (CN); Jian Sun, Beijing (CN); Yongning Fu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 18/725,308

(22) PCT Filed: Dec. 13, 2022

(86) PCT No.: PCT/CN2022/138620
§ 371 (c)(1),
(2) Date: Jun. 28, 2024

(87) PCT Pub. No.: WO2023/124962
PCT Pub. Date: Jul. 6, 2023

(65) Prior Publication Data
US 2025/0131348 A1 Apr. 24, 2025

(30) Foreign Application Priority Data
Dec. 31, 2021 (CN) .......................... 202111665220.2

(51) Int. Cl.
G06Q 10/0631 (2023.01)
G06F 3/04842 (2022.01)
H04L 51/21 (2022.01)

(52) U.S. Cl.
CPC ... *G06Q 10/06311* (2013.01); *G06F 3/04842* (2013.01); *H04L 51/21* (2022.05)

(58) Field of Classification Search
CPC ..... H04L 1/00–2463/00; G06F 1/00–2123/00; G06Q 10/00–50/00
(Continued)

(56) References Cited

U.S. PATENT DOCUMENTS 9,712,466 B2 * 7/2017 Cohen ................... H04L 51/216
11,388,120 B2 * 7/2022 Cohen ................... H04L 51/046
(Continued)

FOREIGN PATENT DOCUMENTS

CN 107623731 A 1/2018
CN 107809372 A 3/2018
(Continued)

OTHER PUBLICATIONS

International Search Report and Written Opinion for PCT/CN2022/138620, mailed Mar. 10, 2023, 19 pages.
(Continued)

*Primary Examiner* — Alan S Miller
(74) *Attorney, Agent, or Firm* — Astute IP Law Group

(57) ABSTRACT

A task participant adding method and apparatus, an electronic device, and a storage medium. The method comprises: in response to an operation of creating a task in a session, displaying a task creation interface in a session interface, the task creation interface comprising a task participant adding option; in response to a selection operation performed with respect to the task participant adding option, displaying a session member select-all option; and in response to a selection operation performed with respect to the session member select-all option, adding all members of the session as participants of the task, and displaying the session member select-all option as selected.

16 Claims, 10 Drawing Sheets

In response to an operation of creating a task in a session, display a task creation interface in a session interface, the task creation interface comprising a task participant adding option — S210

In response to a selection operation on the task participant adding option, display a session members select-all option, and further display a session member list of the session — S220

In response to a selection operation on the session members select-all option, add all members of the session as participants of the task, and display a selected state of the session members select-all option, and further display a selected state of all the members in the session member list — S230

(58) Field of Classification Search
     USPC ................................................ 705/7.11–7.42
     See application file for complete search history.

(56) References Cited

U.S. PATENT DOCUMENTS

| | | | | | |
|---|---|---|---|---|---|
| 2004/0243677 | A1* | 12/2004 | Curbow | ............... | G06Q 10/109 |
| | | | | | 709/206 |
| 2008/0209417 | A1* | 8/2008 | Jakobson | .............. | G06F 9/4856 |
| | | | | | 718/100 |
| 2014/0207867 | A1* | 7/2014 | Kotler | ................. | H04L 65/4015 |
| | | | | | 709/204 |
| 2014/0237389 | A1* | 8/2014 | Ryall | .................... | H04L 65/403 |
| | | | | | 715/753 |
| 2015/0215246 | A1* | 7/2015 | Lung | ..................... | G06F 3/0482 |
| | | | | | 715/752 |
| 2016/0277341 | A1* | 9/2016 | Garen | ................... | G06F 3/0481 |

FOREIGN PATENT DOCUMENTS

| | | |
|---|---|---|
| CN | 109962833 A | 7/2019 |
| CN | 110880093 A | 3/2020 |
| CN | 111162998 A | 5/2020 |
| CN | 111277487 A | 6/2020 |
| CN | 112437004 A | 3/2021 |
| CN | 112650430 A | 4/2021 |
| CN | 112686631 A | 4/2021 |
| CN | 112751746 A | 5/2021 |
| CN | 113285868 A | 8/2021 |
| CN | 113489637 A | 10/2021 |
| CN | 114338576 A | 4/2022 |

OTHER PUBLICATIONS

Office Action for Chinese Patent Application No. 202111665220.2, mailed Mar. 29, 2023, 20 pages.

* cited by examiner

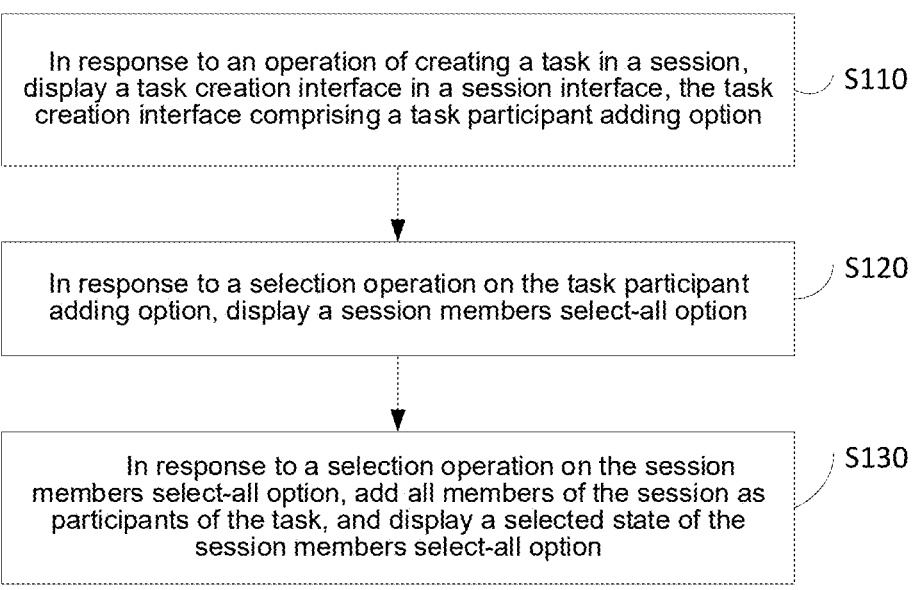

In response to an operation of creating a task in a session, display a task creation interface in a session interface, the task creation interface comprising a task participant adding option ⟋ S110

In response to a selection operation on the task participant adding option, display a session members select-all option ⟋ S120

In response to a selection operation on the session members select-all option, add all members of the session as participants of the task, and display a selected state of the session members select-all option ⟋ S130

Fig.1

Operation menu

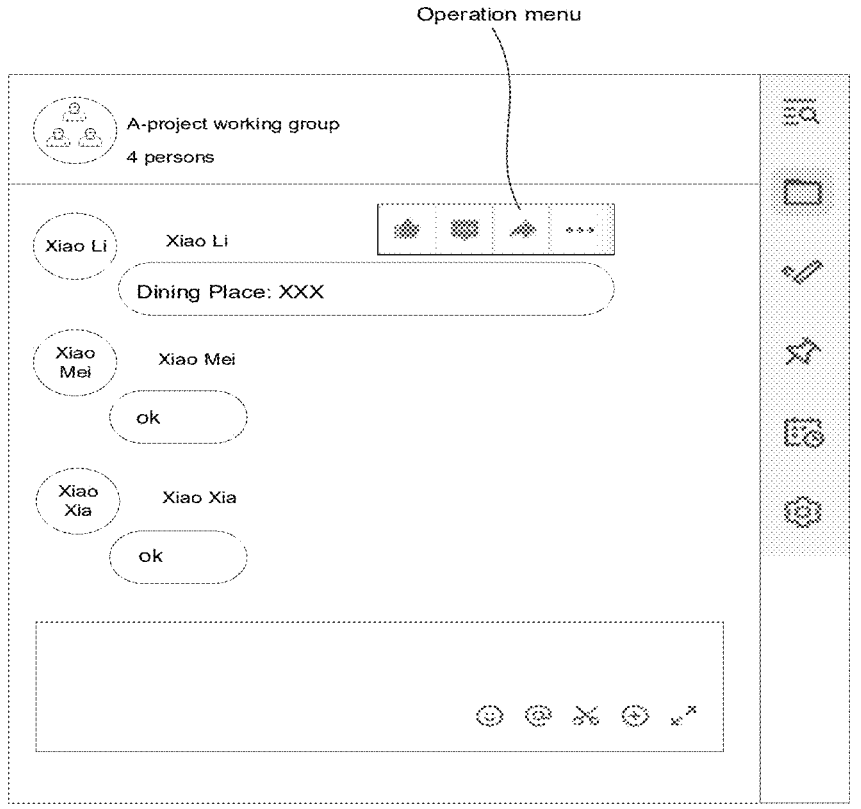

A-project working group
4 persons

Xiao Li        Xiao Li

Dining Place: XXX

Xiao Mei      Xiao Mei ok

Xiao Xia      Xiao Xia ok

Fig.2

Task content input box

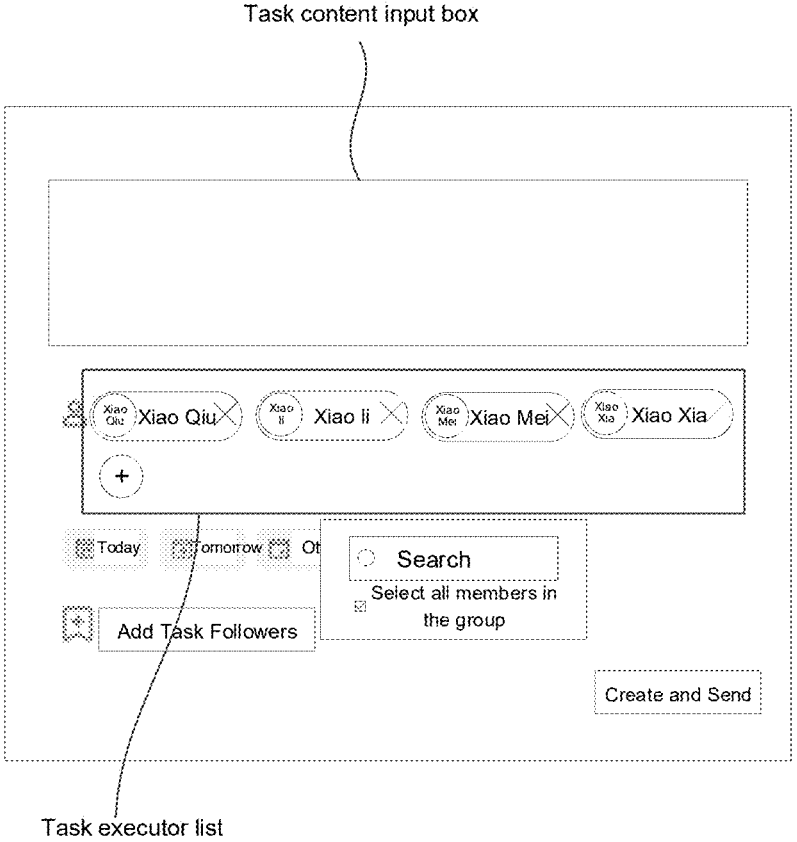

Task executor list

Fig.8

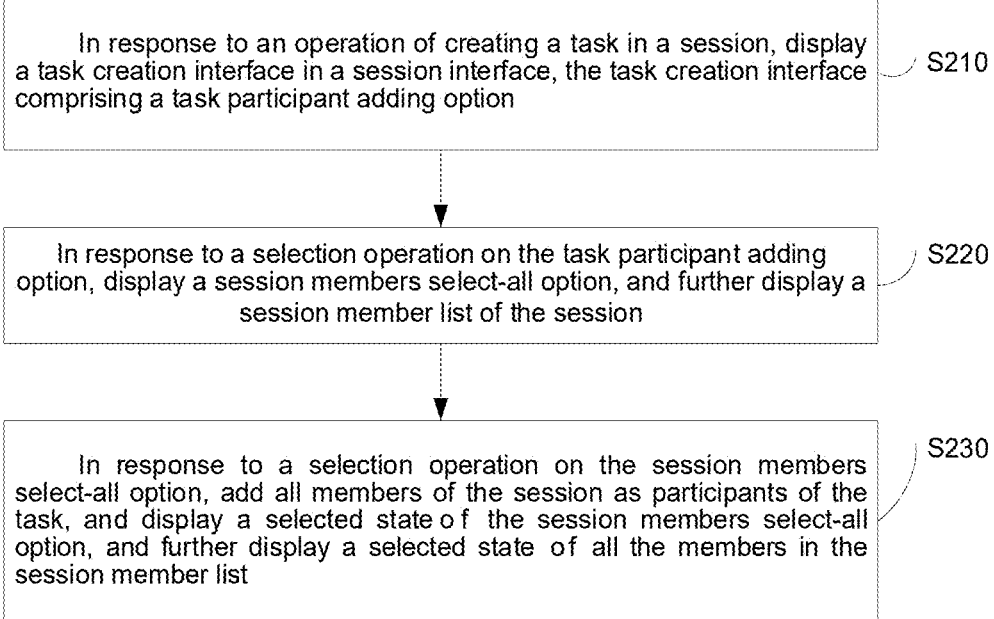

In response to an operation of creating a task in a session, display a task creation interface in a session interface, the task creation interface comprising a task participant adding option — S210

In response to a selection operation on the task participant adding option, display a session members select-all option, and further display a session member list of the session — S220

In response to a selection operation on the session members select-all option, add all members of the session as participants of the task, and display a selected state of the session members select-all option, and further display a selected state of all the members in the session member list — S230

Fig.9

Task content input box

Session member list

Check box

Select All Session Member option

Check box

Cancel control

Create and Send control

Task content input box

Task executor list 310　　　　　　　320　　　　　　　330

| First display module | Second display module | Determination module |
| --- | --- | --- |

TASK PARTICIPANT ADDING METHOD AND APPARATUS, ELECTRONIC DEVICE, AND STORAGE MEDIUM

CROSS-REFERENCE TO RELATED APPLICATIONS

The present application is a National Stage Entry of International application No. PCT/CN2022/138620 filed on Dec. 13, 2022, which based on and claims the priority to the Chinese application No. 202111665220.2 filed on Dec. 31, 2021, and entitled "TASK PARTICIPANT ADDING METHOD AND APPARATUS, ELECTRONIC DEVICE, AND STORAGE MEDIUM", the disclosure of which is incorporated by reference herein in its entirety.

TECHNICAL FIELD

The present disclosure relates to the technical field of instant messaging, and in particular, to a task participant adding method and apparatus, an electronic device, and a storage medium.

BACKGROUND

Currently, a lot of instant messaging software allows a user to create a task. Here, the task may be understood as a to-do item. After the task is created, a terminal can automatically remind the user, to prevent the occurrence of the task being overdue due to complex affairs of the user.

SUMMARY

The present disclosure provides a task participant adding method and apparatus, an electronic device, and a storage medium.

In a first aspect, a task participant adding method comprises:

in response to an operation of creating a task in a session, displaying a task creation interface in a session interface, the task creation interface comprising a task participant adding option;

in response to a selection operation on the task participant adding option, displaying a session members select-all option; and in response to a selection operation on the session members select-all option, adding all members of the session as participants of the task, and displaying a selected state of the session members select-all option.

In a second aspect, the present disclosure further provides a task participant adding apparatus, comprising:

a first display module configured to, in response to an operation of creating a task in a session, display a task creation interface in a session interface, the task creation interface comprising a task participant adding option;

a second display module configured to, in response to a selection operation on the task participant adding option, display a session members select-all option; and a determination module configured to, in response to the selection operation on the session members select-all option, add all members of the session as participants of the task.

In a third aspect, the present disclosure further provides an electronic device, comprising:

one or more processors; and a storage configured to store one or more programs, the one or more programs, when executed by the one or more processors, cause the one or more processors to implement the task participant adding method as described above.

In a fourth aspect, the present disclosure further provides a computer-readable storage medium having thereon stored a computer program which, when executed by a processor, implements the task participant adding method as described above.

In a fifth aspect, the present disclosure further provides a computer program, comprising: instructions which, when executed by a processor, cause the processor to perform the task participant adding method as described above.

In a sixth aspect, the present disclosure further provides a computer program product, comprising: computer program/instructions which, when executed by a processor, cause the processor to perform the task participant adding method as described above.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

In order to more clearly illustrate technical solutions in the embodiments of the present disclosure or the related art, the drawings required for use in the description of the embodiments or the related art will be briefly described below, and it is obvious that, for one of ordinary skill in the art, other drawings can be obtained according to these drawings without paying creative labor.

FIG. 1 is a flow diagram of a task participant adding method according to an embodiment of the present disclosure;

FIGS. 2-3 are partial schematic diagrams of a terminal display interface in a process of implementing S110 in FIG. 1 according to an embodiment of the present disclosure;

FIG. 8 is a schematic diagram of the task creation interface after a user selects a session members select-all option on the basis of FIG. 7;

FIG. 9 is a flow diagram of another task participant adding method according to an embodiment of the present disclosure;

DETAILED DESCRIPTION

Figure 3:
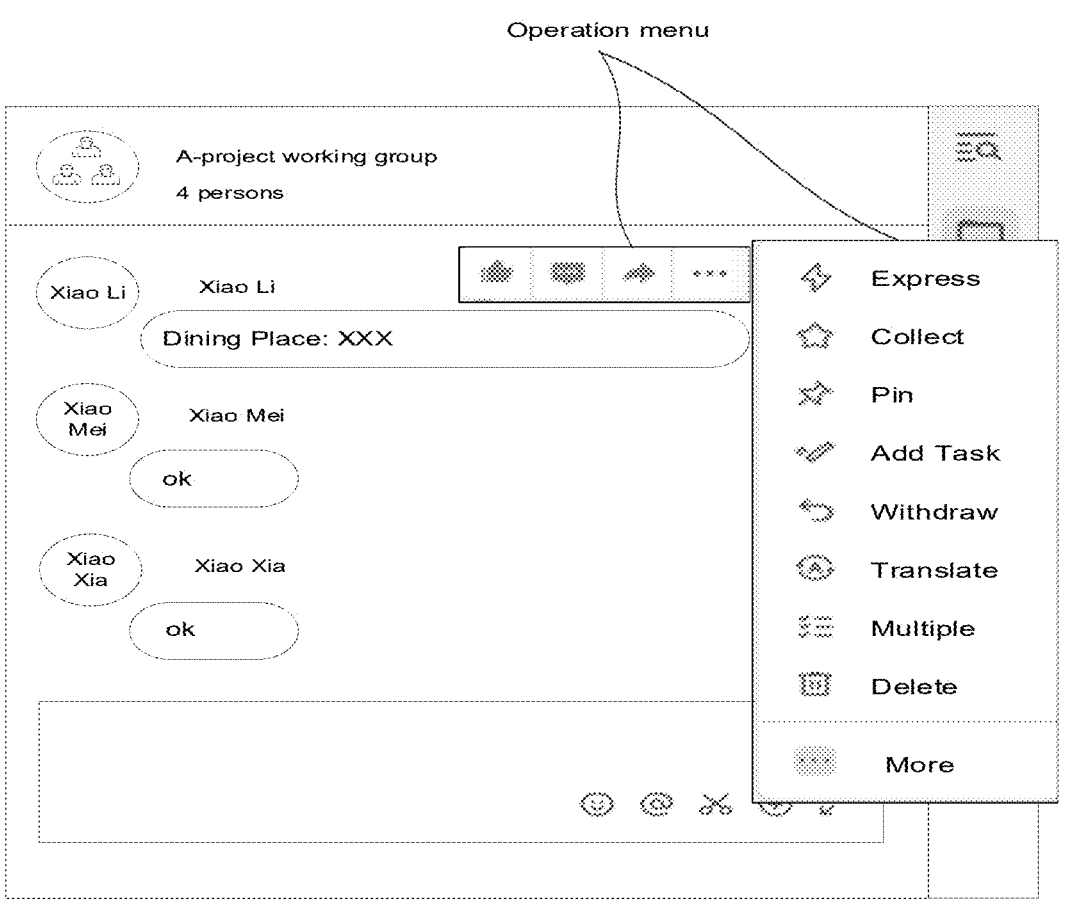

In order that the above objectives, features and advantages of the present disclosure can be more clearly understood, solutions of the present disclosure will be further described below. It should be noted that, without conflict, embodiments of the present disclosure and features in the embodiments may be combined with each other.

In the following description, numerous specific details are set forth in order to provide a thorough understanding of the present disclosure, but the present disclosure may be implemented in other ways different from those described herein; and it is obvious that the embodiments in the description are only a part of the embodiments of the present disclosure, rather than all of them.

In practice, a plurality of persons may be required to jointly accomplish one same task, that is, there are a plurality of task executors, or the progress of the task can be followed by a plurality of persons, that is, there are a plurality of task followers. In view of this case, how to assist a user in quickly setting task executors or task followers when creating a task is an urgent problem to be solved at present.

In order to solve the above problem, the present disclosure provides a task participant adding method and apparatus, an electronic device, and a storage medium.

FIG. 1 is a flow diagram of a task participant adding method according to an embodiment of the present disclosure; this embodiment is applicable to a case where a task is created in a client, and the method may be executed by a task participant adding apparatus, which may be implemented in software and/or hardware, and may be configured in an electronic device, for example, a terminal, specifically including but not limited to a smartphone, a palmtop computer, a tablet computer, a wearable device with a display screen, a desktop computer, a laptop computer, an all-in-one machine, a smart home appliance, and the like.

As shown in FIG. 1, the method may specifically comprise: S110, in response to an operation of creating a task in a session, displaying a task creation interface in a session interface, the task creation interface comprising a task participant adding option.

Task creation interface allows for configuring one or more of content, reminder time, deadline, note, executors or followers of the task.

Task participants are task executors or task followers. Accordingly, the task participant adding option is a task executor adding option or a task follower adding option. The task executor adding option is used for configuring the executors of the task. In practice, the task can be assigned to others or to oneself through the task executor adding option. The task follower adding option is used for configuring the followers of the task. In practice, a follow permission of the task can be assigned to others or to oneself through the task follower adding option.

There are various specific implementations for this step, which can be, exemplarily, one or more of the following.

1) In response to a message-to-task operation, a task is created in a session. FIG. 2-FIG. 3 are partial schematic diagrams of a terminal display interface in a process of implementing S110 according to an embodiment of the present disclosure. Referring to FIGS. 2 and 3, assuming that a user wishes to convert a message "Dining Place: XXX" into a task, the user may hover a mouse over the message "Dining Place: XXX", a terminal displays an operation menu for the message, and the user clicks on " . . . ">"Add Task" in the operation menu to complete a message-to-task operation. In response to the message-to-task operation, the task is created in the session.

It should be noted that when the message is converted into the task, a sender of the message converted into the task may be a creator of the task or another person other than the creator of the task.

Figure 4:
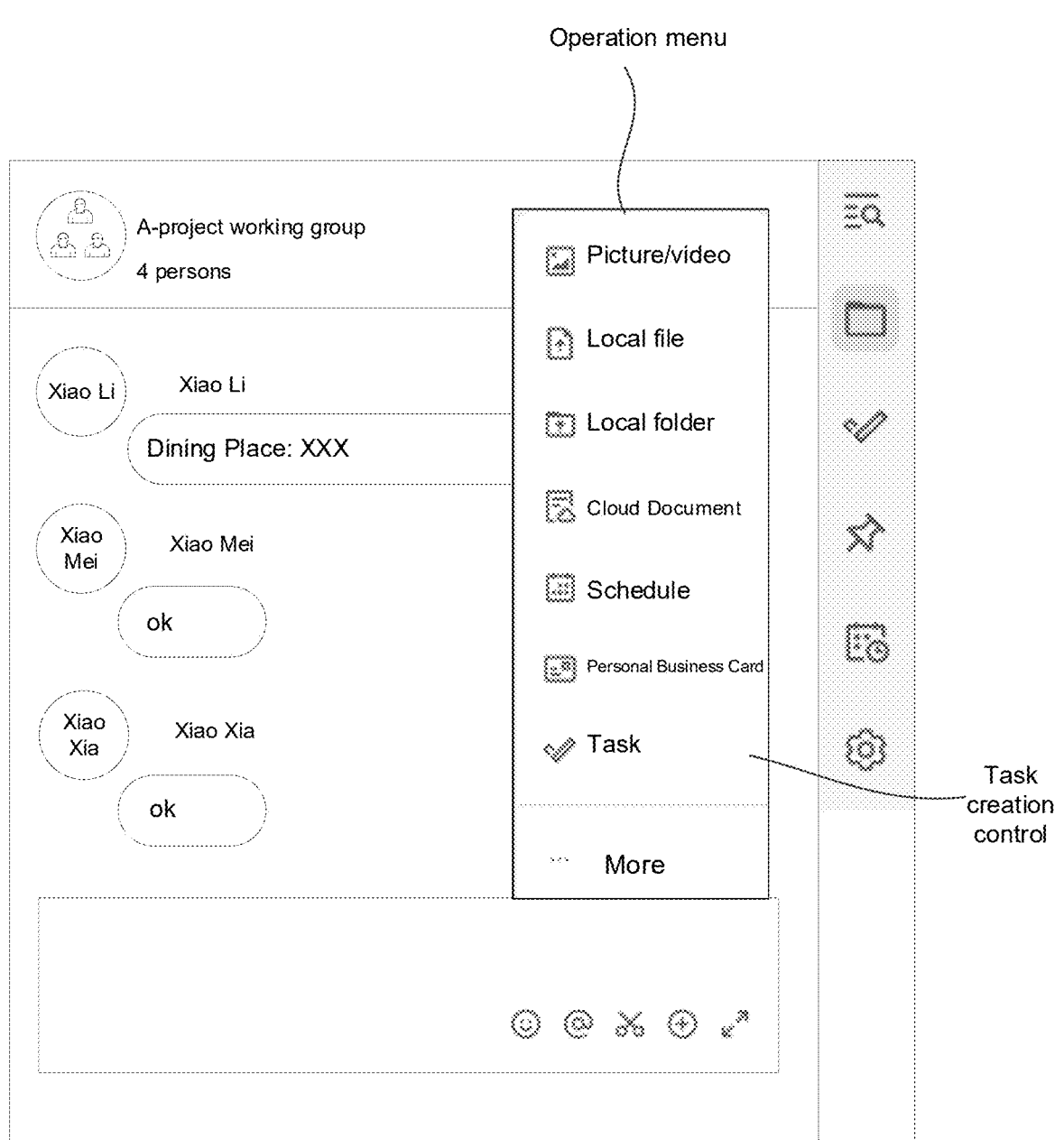
FIG. 4 is a partial schematic diagram of another terminal display interface in a process of implementing S110 according to an embodiment of the present disclosure.

2) In response to an operation of triggering a task creation control in a message input box, a task is created in the session. FIG. 4 is a partial schematic diagram of another terminal display interface in a process of implementing S110 according to an embodiment of the present disclosure. Referring to FIG. 4, the user may complete an operation of triggering a task creation control by clicking on "+">"Task" in a message input box, and the terminal, in response to the operation of triggering the task creation control in the message input box, creates the task in the session.

Figure 5:
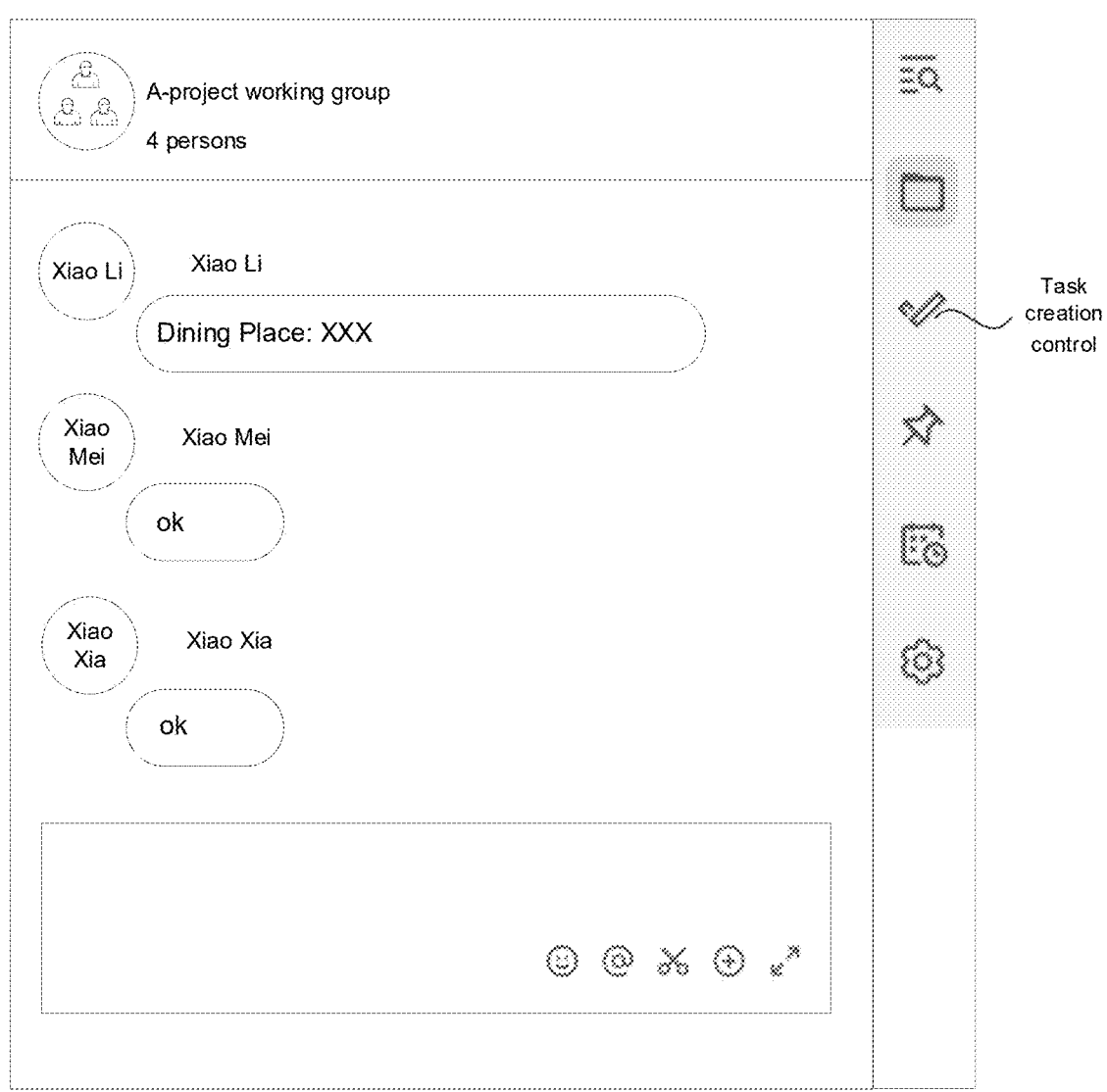
FIG. 5 is a partial schematic diagram of another terminal display interface in a process of implementing S110 according to an embodiment of the present disclosure.

3) In response to an operation of triggering a task creation control in a session sidebar, a task is created in the session. FIG. 5 is a partial schematic diagram of another terminal display interface in a process of implementing S110 according to an embodiment of the present disclosure. Referring to FIG. 5, the user may complete an operation of triggering a task creation control in a session sidebar by clicking on a task creation control in a right sidebar of the session, and the terminal, in response to the operation of triggering the Create-Task control in the session sidebar, creates the task in the session.

S120, in response to a selection operation on the task participant adding option, displaying a session members select-all option.

The session members select-all option is used for assisting the user in adding task participants. Specifically, when the user selects the session members select-all option, all members in the current session are added as participants of the task.

Figure 6:
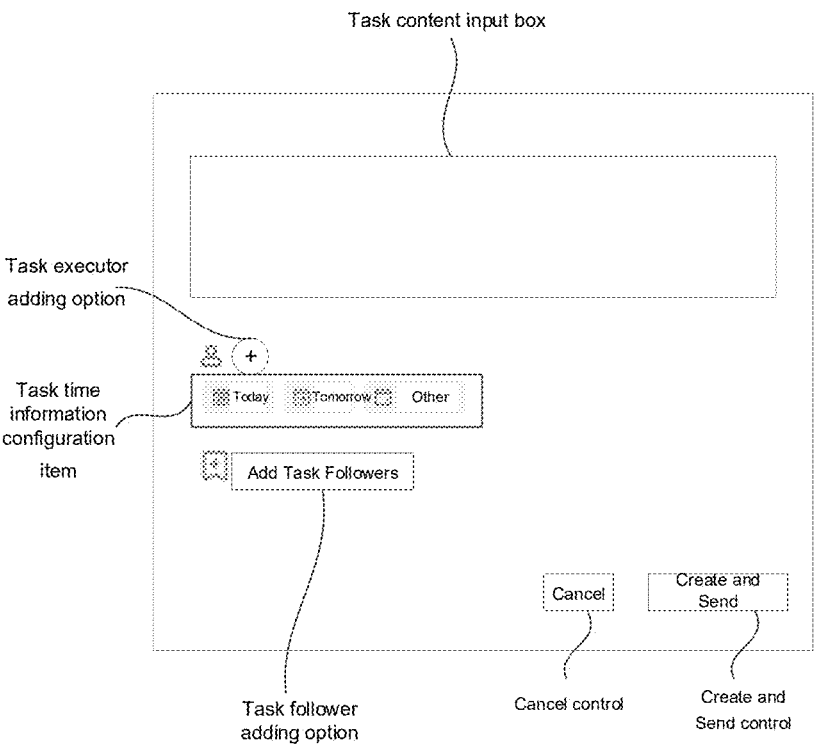
FIG. 6 and FIG. 7 are schematic diagrams of a task creation interface according to an embodiment of the present disclosure.
Figure 7:
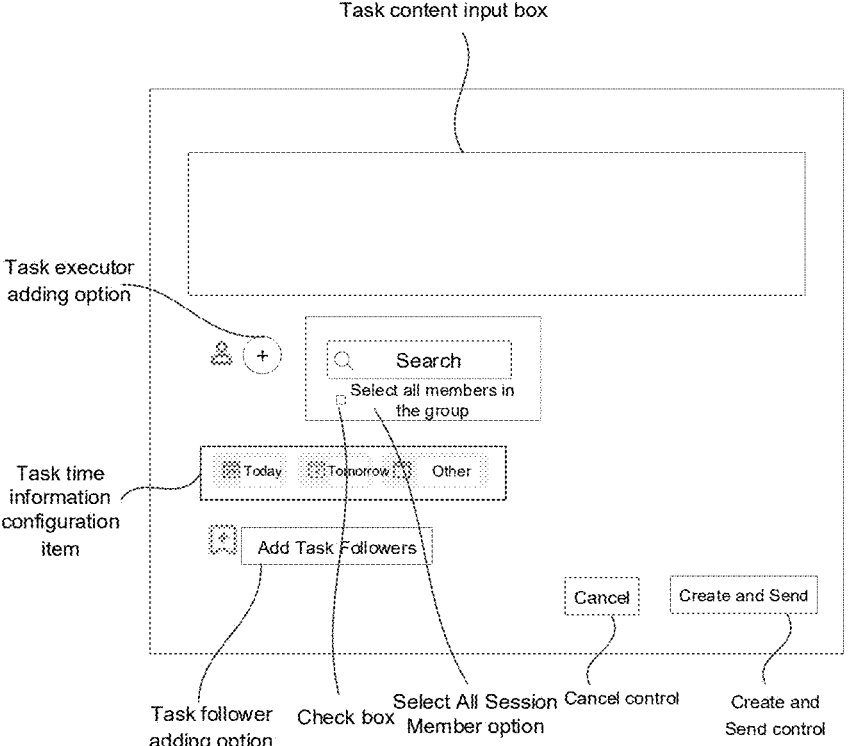

FIG. 6 and FIG. 7 are schematic diagrams of a task creation interface according to an embodiment of the present disclosure. Referring to FIG. 6, the task creation interface includes a task content input box, a task executor adding option, a task time information configuration item, a task follower adding option, a Create and Send control, and a Cancel control.

The task content input box is used for inputting or modifying text description of the task.

The task time information configuration item is used for configuring reminder time and/or deadline of the task.

The task executor adding option is used for configuring an executors of the task, i.e., determining which member can be added as an executor of the task.

The task follower adding option is used for configuring follower of the task, i.e., determining which member can be added as a follower of the task.

After the content of the task, the task executor, the task follower, and the task time information are configured, the creation of the task can be completed by triggering the Create and Send control, and the created task is sent to each task executor and each task follower.

The Cancel control is used for canceling the task creation operation.

Continuing referring to FIG. 7, when the user clicks on the task executor adding option, the session members select-all option is displayed.

Similarly, when the user clicks on the task follower adding option, the session members select-all option is displayed.

S130, in response to a selection operation on the session members select-all option, adding all members of the session as participants of the task, and displaying a selected state of the session members select-all option.

Exemplarily, continuing referring to FIG. 7, a check box is provided in front of the session members select-all option, wherein when "√" appears in the check box, it is indicated that the session members select-all option is selected. When the check box is null, it is indicated that the session members select-all option is unselected.

FIG. 8 is a schematic diagram of a task creation interface after a user selects a session members select-all option on the basis of FIG. 7. Referring to FIG. 8, assuming that the session includes only 4 members, which are Xiao Qiu, Xiao Li, Xiao Mei and Xiao Xia, respectively, the user clicks on the check box in front of the session members select-all option, to add all the members in the current session as the executors of the task, so that avatar and name icons of Xiao Qiu, Xiao Li, Xiao Mei and Xiao Xia appear in a task executor list, while "√" appears in the check box, that is, a selected state of the session members select-all option is displayed.

It should be noted that, the task executor list in the task creation interface is used for collectively displaying currently added all executors, making it convenient for the user to know exactly which executors have been added.

The implementation solution of adding the task followers is similar to the above solution of adding the task executors, and is not repeated herein.

In the above technical solution, by providing the following of: in response to a selection operation on a task participant adding option, displaying a session members select-all option; and in response to a selection operation on the session members select-all option, adding all members of the session as participants of the task, and displaying a selected state of the session members select-all option, when a user needs to add all the members of the session as the participants of the task, he can complete the addition of all the session members in just one step of selecting the session members select-all option, without searching and selecting the members in the session one by one, which can achieve the purpose of assisting the user in quickly setting the task participants to improve the efficiency of setting the task participants by the user.

FIG. 9 is a flow diagram of another task participant adding method according to an embodiment of the present disclosure, referring to FIG. 9, the method comprising:

S210, in response to an operation of creating a task in a session, displaying a task creation interface in a session interface, the task creation interface comprising a task participant adding option;

S220, in response to a selection operation on the task participant adding option, displaying a session members select-all option, and further displaying a session member list of the session.

In some embodiments, in response to the selection operation on the task participant adding option, on the basis of an id of the session, session member information is pulled, and on the basis of the session member information, the session member list is formed and displayed.

S230, in response to a selection operation on the session members select-all option, adding all members of the session as participants of the task, and displaying the selected state of the session members select-all option, and further displaying a selected state of all the members in the session member list.

Figure 10:
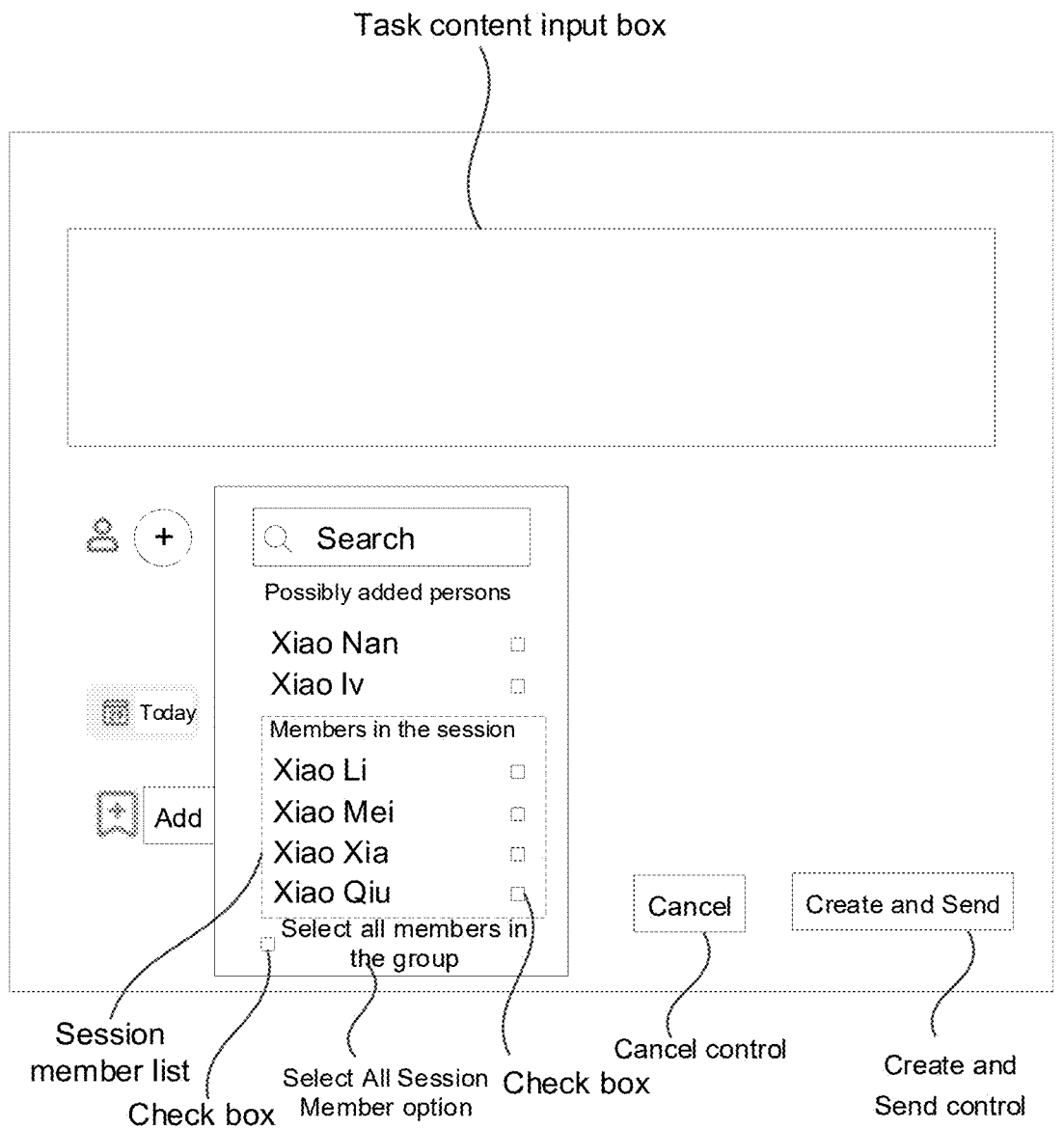
FIGS. 10-11 are schematic diagrams of a task creation interface in a process of adding task executors by a user.
Figure 11:
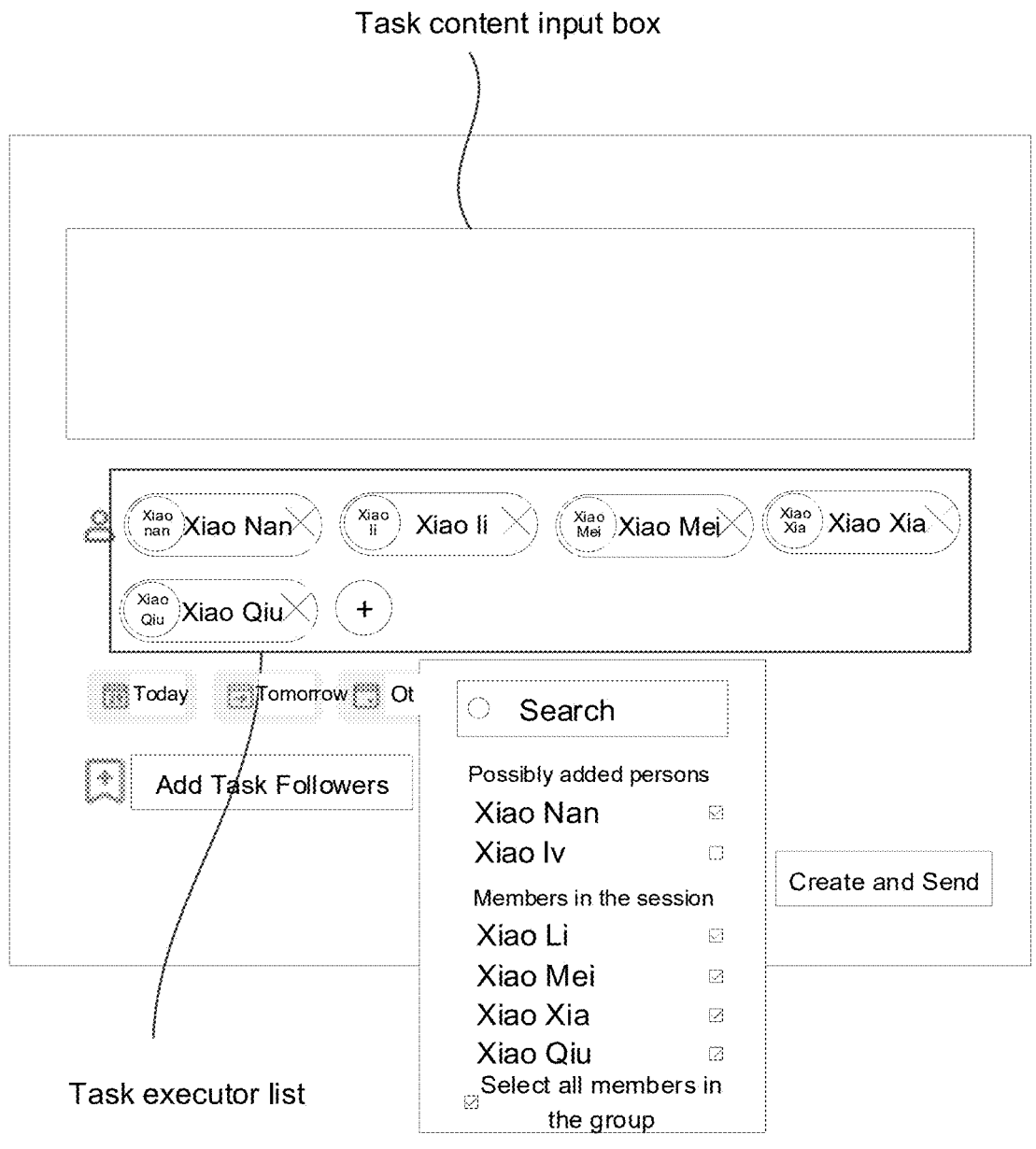

FIGS. 10-11 are schematic diagrams of a task creation interface in a process of adding task executors by a user. Exemplarily, referring to FIG. 10, in response to a selection operation on a task executor adding option, a session members select-all option and a session member list of a session are displayed. The session member list may have therein displayed all or part of the members of the session. And in the session member list, each member corresponds to one check box. When "√" appears in the check box, it is indicated that the member is selected, and the member is added as an executor of the task. When the check box is null, it is indicated that the member is unselected, and the member is not added as an executor of the task.

Assume that the session includes only 4 members, which are Xiao Qiu, Xiao Li, Xiao Mei, and Xiao Xia, respectively. Since in FIG. 10, a user does not select any of the session members as the task executor, there is no task executor at this time. On the basis of the display state in FIG. 10, when the user clicks on a check box in front of the session members select-all option, i.e., selects the session members select-all option, continuing referring to FIG. 11, all the members in the current session are added as the executors of the task, and avatar and name icons of Xiao Qiu, Xiao Li, Xiao Mei, and Xiao Xia appear in a task executor list, while "√" appears in the check box of the session members select-all option, that is, a selected state of the session members select-all option is displayed. And "√" appears in the check box corresponding to each member in the session member list, that is, a selected state of all the members in the session member list is displayed.

Continuing referring to FIG. 10, optionally, in response to a selection operation on the task executor adding option, in addition to the session members select-all option and the session member list of the session, a list of possibly added persons is further displayed, which is used for displaying other persons than the session members.

The implementation solution of adding the task followers is similar to the solution of adding the task executors, and is not repeated herein.

Further, if all the members of the session are large in number and limited by the size of the session member list, a scroll bar may be provided in the session member list, so that the user can switch the members displayed in the session member list by adjusting a position of the scroll bar.

Optionally, the method further comprises: in response to a deselection operation on part of the members in the session member list, canceling adding the part of the members as the participants of the task, and displaying an unselected state of the part of the members.

Figures 12, 13:
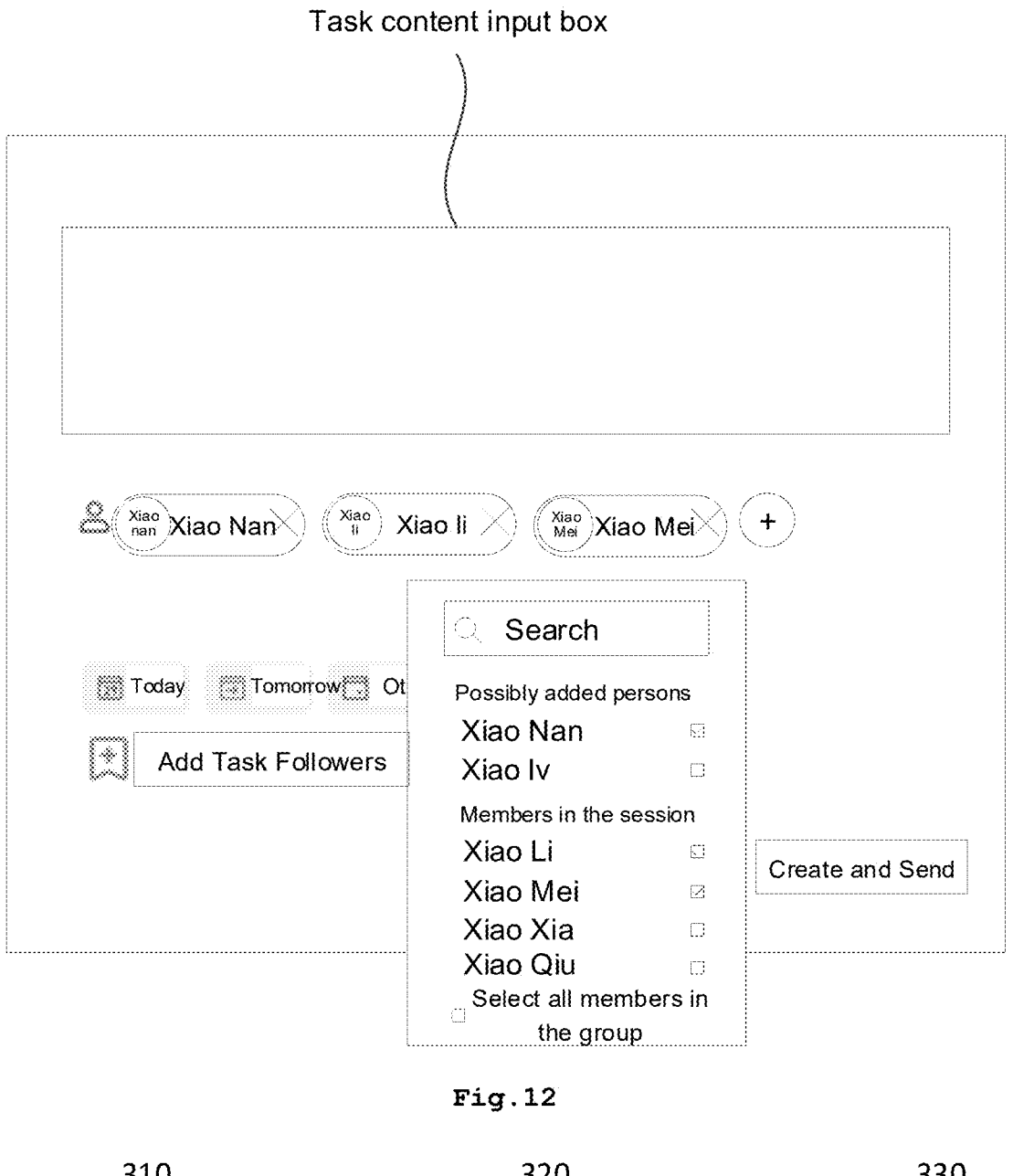
FIG. 12 is a schematic diagram of a task creation interface in a process of adding task executors by a user.
FIG. 13 is a schematic structural diagram of a task participant adding apparatus according to an embodiment of the present disclosure.

FIG. 12 is a schematic diagram of a task creation interface in a process of adding task executors by a user. Since in FIG. 11, the user has added Xiao Xia and Xiao Qiu as the executors of the task by clicking on the check box in front of the session members select-all option. On the basis of the state shown in FIG. 11, when the user clicks on the check box corresponding to Xiao Xia and the check box corresponding to Xiao Qiu, referring to FIG. 12, Xiao Xia and Xiao Qiu are deselected, i.e., Xiao Xia and Xiao Qiu are no longer added as the executors of the task, and the check box corresponding to Xiao Xia and the check box corresponding to Xiao Qiu become null, i.e., Xiao Xia and Xiao Qiu are displayed in unselected state. The implementation solution of cancelling the task followers is similar to the solution of cancelling the task executors, and is not repeated herein.

In the above technical solution, by providing the following of: in response to a deselection operation on part of the members in the session member list, cancelling adding the part of the members as the participants of the task, and displaying in the session member list an unselected state of the part of the members, the user is allowed to delete the previously determined participants, which is conducive to meeting various practical usage scenes.

Further, the method may further comprise: in response to a selection operation on part of the members in the session member list, adding the part of the members as the participants of the task, and displaying a selected state of the part of the members.

Obviously, by providing the following of: in response to a selection operation on the session members select-all option, displaying a selected state of all the members in the session member list, it makes convenient for the user to know exactly which participants have been added, and for subsequent addition or deletion of the participants.

On the basis of the above technical solutions, optionally, a task participant list is updated based on any one of the selection operation or a deselection operation on the session members select-all option; and/or, the task participant list is updated based on any one of a selection operation or a deselection operation on each member in the session member list of the session. The task participant list is used for collectively displaying the selected participants. This setting can ensure that the participants displayed in the task participant list are accurate, avoiding misleading the user.

Further, in the task participant list, information of a same participant occupies only one display position. In a process of same task creation, the user may repeatedly perform the selection operation and the deselection operation on a certain member for many times. In this case, if an operation performed for the last time was the selection operation, the member only occupies one display position in the task participant list. In this way, it is possible to make the number of the occupied display positions in the task participant list consistent with the number of the participants. It is convenient for the user to quickly know who the current participants are through the task participant list.

On the basis of the above technical solution, optionally, the solution further comprises: determining whether all members of current session appear in the task participant list; if all the members of the current session appear in the task participant list and the session members select-all option is in the unselected state, setting the session members select-all option to the selected state; and if only part of the members of the current session appear in the task participant list and the session members select-all option is in the selected state, setting the session members select-all option to the unselected state.

Exemplarily, continuing referring to FIG. 12, since Xiao Xia and Xiao Qiu among the session members are unselected, Xiao Xia and Xiao Qiu are no longer the executors of the task, so that the task executor list does not include Xiao Xia and Xiao Qiu. By comparing all the members of the session with the persons in the task executor list, it is found that the task executor list lacks Xiao Xia and Xiao Qiu; in this case, if "√" appears in the check box of the session members select-all option, the "√" in the check box of the session members select-all option is removed, so that the check box of the session members select-all option is null. This setting can ensure that the displayed state of the session members select-all option is always accurate, avoiding misleading the user. In the process of adding the task followers, the solution for implementing synchronization of the task follower list with the displayed state of the session members select-all option is similar to solution for implementing the synchronization of the task executor list with the displayed state of the session members select-all option in the process of adding the task executors, and is not repeated herein.

On the basis of the above technical solutions, optionally, S220 comprises: in response to the selection operation on the task participant adding option, determining whether the adding all the members of the session as the participants of the task is restricted; if it is not restricted, displaying the session members select-all option and the session member list of the session, the session members select-all option being in a selectable state, and the member list of the session comprising all the members of the session; if it is restricted, either not displaying the session members select-all option, or displaying the session members select-all option in an unselectable state; and displaying the session member list of the session.

In the case where it is not restricted, "the session members select-all option being in a selectable state" means that the user is allowed to select the session members select-all option. In other words, the user has a permission to select the session members select-all option, so that all the session members can be added as the task participants. In the case where it is restricted, "the session members select-all option being in an unselectable state" means that the user is not allowed to select the session members select-all option. In other words, the user does not have the permission to select the session members select-all option, so that he is not allowed to add all the session members as the task participants. Optionally, the session members select-all option is grayed out to make it appear unselectable.

Further, if the maximum number of participants allowed to be set for the task is less than the number of all the members of the session, it is determined that the adding all the members of the session as the participants of the task is restricted, the displayed session member list of the session comprising all the members of the session; and/or if the session is only allowed to display part of the members, it is determined that the adding all the members of the session as the participants of the task is restricted, the displayed session member list of the session comprising only the part of the members of the session. That the session is only allowed to display part of the members is applicable to a scene where the session group has security restrictions.

It should be noted that for the above method embodiments, for the sake of simple description, they all are described as a series of action combinations, but those skilled in the art should understand that the present disclosure is not limited by the described order of actions, as certain steps may be performed in other orders or simultaneously according to the present disclosure. Secondly, those skilled in the art should also understand that the embodiments described in the description are all preferred embodiments and that actions and modules involved are not necessarily required for the present disclosure.

FIG. 13 is a schematic structural diagram of a task participant adding apparatus according to an embodiment of the present disclosure. The task participant adding apparatus provided in the embodiment of the present disclosure can be configured in a client. Referring to FIG. 13, the task t adding apparatus specifically comprises:

a first display module 310 configured to, in response to an operation of creating a task in a session, display a task creation interface in a session interface, the task creation interface comprising a task participant adding option;

a second display module 320 configured to, in response to a selection operation on the task participant adding option, display a session members select-all option; and a determination module 330 configured to, in response to a selection operation on the session members select-all option, add all members of the session as participants of the task.

Further, the second display module 320 is configured to, in response to the selection operation on the task participant adding option, display the session members select-all option, and further display a session member list of the session; and the determination module 330 is configured to, in response to the selection operation on the session members select-all option, add all the members of the session as the participants of the task, display the selected state of the session members select-all option, and further display a selected state of all the members in the session member list.

Further, the determination module 330 is further configured to, after the in response to the selection operation on the session members select-all option, adding all the members of the session as the participants of the task, and displaying the selected state of the session members select-all option, in response to a deselection operation on part of the members in the session member list, cancel adding the part of the members as the participants of the task, and display an unselected state of the part of the members in the session member list.

Further, the determination module 330 is further configured to:

update a task participant list based on any one of the selection operation or a deselection operation on the session members select-all option; and/or update a task participant list based on any one of a selection operation or a deselection operation on each member in the session member list of the session, the task participant list being used for collectively displaying all participants added.

Further, in the task participant list, information of one same participant occupies only one display position.

Further, the determination module 330 is further configured to:

determine whether all members of current session appear in the task participant list;

if all the members of the current session appear in the task participant list and the session members select-all option is in the unselected state, set the session members select-all option to the selected state; and if only part of the members of the current session appear in the task participant list and the session members select-all option is in the selected state, set the session members select-all option to the unselected state.

Further, the second display module 320 is further configured to:

in response to the selection operation on the task participant adding option, determine whether the adding all the members of the session as the participants of the task is restricted;

if the adding all the members of the session as the participants of the task is not restricted, display the session members select-all option and the session member list of the session, the session members select-all option being in a selectable state, and the member list of the session comprising all the members of the session; and if the adding all the members of the session as the participants of the task is restricted, either not display the session members select-all option, or display the session members select-all option in an unselectable state; and display the session member list of the session.

Further, the second display module 320 is further configured to:

if the maximum number of participants allowed to be set for the task is less than the number of the session members, determine that the adding all the members of the session as the participants of the task is restricted, the displayed session member list of the session comprising all the members of the session;

and/or, if the session is only allowed to display part of the members, determine that the adding all the members of the session as the participants of the task is restricted, the displayed session member list of the session only comprising the part of the members of the session.

Further, the first display module 310 is further configured to participate in one or more of:

in response to a message-to-task operation, creating the task in the session;

in response to an operation of triggering a task creation control in a message input box, creating the task in the session; and in response to an operation of triggering a task creation control in a session sidebar, creating the task in the session.

Further, the task participants are: task executors or task followers.

The task participant adding apparatus provided in the embodiment of the present disclosure may perform the steps performed by the client in the task participant adding method provided in the embodiment of the present disclosure, and has beneficial effects of performing the steps, which are not repeated herein.

Figure 14:
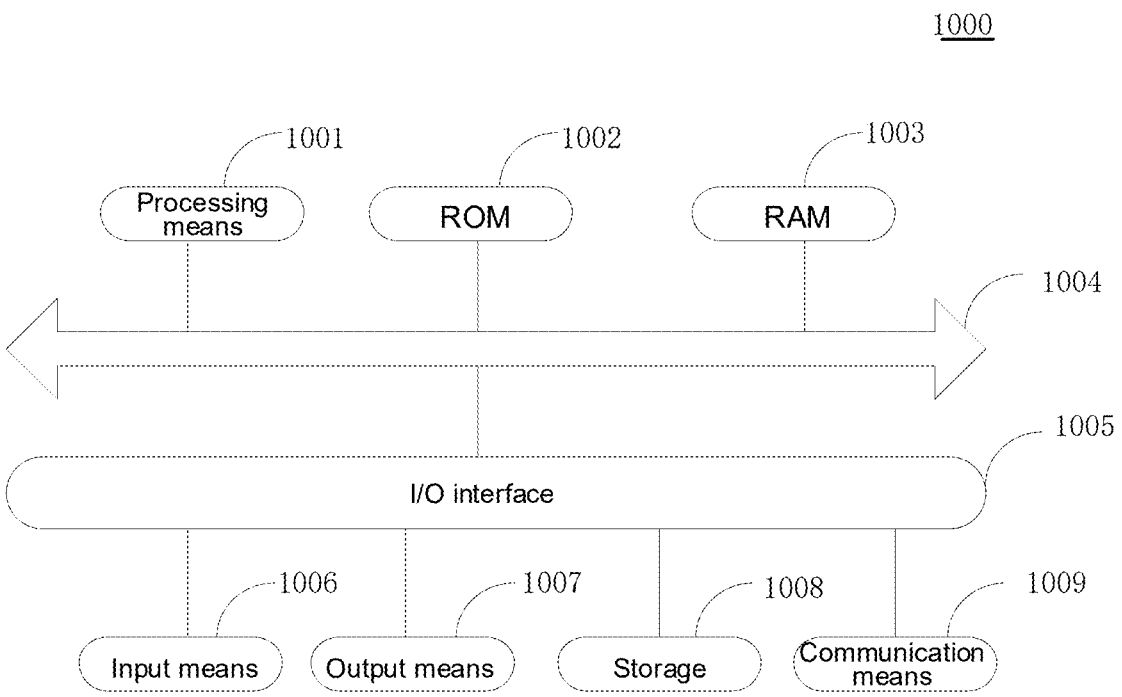
FIG. 14 is a schematic structural diagram of an electronic device according to an embodiment of the present disclosure.

FIG. 14 is a schematic structural diagram of an electronic device according to an embodiment of the present disclosure. Referring specifically to FIG. 14 below, it illustrates a schematic structural diagram of an electronic device 1000 suitable for implementing an embodiment of the present disclosure. The electronic device 1000 in the embodiment of the present disclosure may include, but is not limited to, a mobile terminal such as a mobile phone, laptop computer, digital broadcast receiver, PDA (Personal Digital Assistant), PAD (Portable Android Device), PMP (Portable Multimedia Player), vehicle-mounted terminal (e.g., vehicle-mounted navigation terminal), and wearable electronic device, and a fixed terminal such as a digital TV, desktop computer, and smart home appliance. The electronic device shown in FIG. 14 is only an example, and should not bring any limitation to the functions and the scope of use of the embodiment of the present disclosure.

As shown in FIG. 14, the electronic device 1000 may include a processing means (e.g., a central processing unit, a graphics processing unit, etc.) 1001 which may perform various appropriate actions and processes according to a program stored in a read-only memory (ROM) 1002 or a program loaded from a storage 1008 into a random access memory (RAM) 1003 to implement the task participant adding method according to the embodiment described in the present disclosure. In the RAM 1003, various programs and information required for the operation of the electronic device 1000 are also stored. The processing means 1001, ROM 1002, and RAM 1003 are connected to each other by a bus 1004. An input/output (I/O) interface 1005 is also connected to the bus 1004.

Generally, the following means may be connected to the I/O interface 1005: an input means 1006 including, for example, a touch screen, touch pad, keyboard, mouse, camera, microphone, accelerometer, gyroscope, etc.; an output means 1007 including, for example, a liquid crystal display (LCD), speaker, vibrator, etc.; the storage 1008 including, for example, a magnetic tape, hard disk, etc.; and a communication means 1009. The communications means 1009 may allow the electronic device 1000 to communicate wirelessly or by wire with other devices to exchange information. While FIG. 14 illustrates the electronic device 1000 having various means, it should be understood that not all illustrated means are required to be implemented or provided. More or fewer means may be alternatively implemented or provided.

In particular, according to an embodiment of the present disclosure, the processes described above with reference to the flow diagrams may be implemented as a computer software program. For example, an embodiment of the present disclosure includes a computer program product comprising a computer program carried on a non-transitory computer-readable medium, the computer program containing program code for performing the method illustrated by the flow diagram, thereby implementing the task participant adding method as described above. In such an embodiment, the computer program may be downloaded and installed from a network through the communication means 1009, or installed from the storage 1008, or installed from the ROM 1002. The computer program, when executed by the processing means 1001, performs the above functions defined in the method of the embodiment of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include an information signal propagated in baseband or as part of a carrier wave, in which computer-readable program code is carried. Such a propagated information signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some implementations, a client and a server may communicate using any currently known or future developed network protocol, such as HTTP (HyperText Transfer Protocol), and may be interconnected with any form or medium of digital information communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may exist separately without being assembled into the electronic device.

The above computer-readable medium has one or more programs carried thereon, wherein the above one or more programs, when executed by the electronic device, cause the electronic device to:

in response to an operation of creating a task in a session, display a task creation interface in a session interface, the task creation interface comprising a task participant adding option;

in response to a selection operation on the task participant adding option, display a session members select-all option; and in response to a selection operation on the session members select-all option, add all members of the session as participants of the task, and display a selected state of the session members select-all option.

In some embodiments, when the above one or more programs are executed by the electronic device, the electronic device may also perform other steps described in the above embodiments.

Computer program code for performing the operation of the present disclosure may be written in one or more programming languages or a combination thereof, wherein the above programming language includes but is not limited to an object-oriented programming language such as Java, Smalltalk, and C++, and also includes a conventional procedural programming language, such as a "C" language or a similar programming language. The program code may be executed entirely on a user's computer, partly on a user's computer, as a stand-alone software package, partly on a user's computer and partly on a remote computer, or entirely on a remote computer or server. In a scenario where a remote computer is involved, the remote computer may be connected to a user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The involved units described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, a hardware logic component of an exemplary type that may be used includes: a field programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided an electronic device, comprising:

one or more processors; and a memory configured to one or more programs, the one or more programs, when executed by the one or more processors, causing the one or more processors to implement any of the task participant adding methods according to the present disclosure.

According to one or more embodiments of the present disclosure, there is provided a computer-readable storage medium having thereon stored a computer program which, when executed by a processor, implements any of the task participant adding methods according to the present disclosure.

An embodiment of the present disclosure further provides a computer program product comprising a computer program or instructions which, when executed by a processor, implement the task participant adding method as described above.

An embodiment of the present disclosure further provides a computer program comprising instructions which, when executed by a processor, cause the processor to implement the task participant adding method as described above.

It should be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device comprising a list of elements not only includes those elements but also includes other elements not expressly listed, or also includes elements inherent to such a process, method, article, or device. Without more limitations, an element defined by a statement "comprising a . . . " does not exclude the presence of another identical element in a process, method, article, or device that includes the element.

The above only describes specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments described herein, but conform to the widest scope consistent with the principles and novel features disclosed herein.

What is claimed is:

1. A method for adding task participants in an application, comprising:

in response to receiving an interactive operation of creating a task in a session, displaying a task creation interface in a session interface, the task creation interface comprising a task participant adding interactive option, wherein the session interface and the task creation interface are both graphical user interfaces (GUIs);

in response to receiving a selection operation on the task participant adding interactive option, displaying a session members select-all interactive option, and further displaying a session member list of the session; and in response to receiving a selection operation on the session members select-all interactive option, adding all members of the session as participants of the task, and displaying a selected state of the session members select-all interactive option, and further displaying a selected state of all the members in the session member list, wherein the in response to receiving the selection operation on the task participant adding interactive option, displaying the session members select-all interactive option, and further displaying the session member list of the session, comprises:

in response to receiving the selection operation on the task participant adding interactive option, if adding all the members of the session as the participants of the task is not restricted, displaying the session members select-all interactive option and the session member list of the session, the session members select-all interactive option being in a selectable state, and the session member list of the session comprising all the members of the session; or if adding all the members of the session as the participants of the task is restricted, either not displaying the session members select-all interactive option, or displaying the session members select-all interactive option in an unselectable state; and displaying the session member list of the session.

2. The method according to claim 1, after the in response to the selection operation on the session members select-all interactive option, adding all the members of the session as the participants of the task, and displaying the selected state of the session members select-all interactive option, further comprising:

in response to a deselection operation on part of the members in the session member list, canceling adding the part of the members as the participants of the task, and displaying an unselected state of the part of the members in the session member list.

3. The method according to claim 1, further comprising at least one of:

updating a task participant list based on any one of the selection operation or a deselection operation on the session members select-all interactive option; or, updating the task participant list based on any one of a selection operation or a deselection operation on each member in the session member list of the session, the task participant list being used for collectively displaying all participants added.

4. The method according to claim 3, wherein in the task participant list, information of one same participant occupies only one display position.

5. The method according to claim 3, further comprising:

determining whether all members of current session appear in the task participant list;

if all the members of the current session appear in the task participant list and the session members select-all interactive option is in an unselected state, setting the session members select-all interactive option to the selected state; and if only part of the members of the current session appear in the task participant list and the session members select-all interactive option is in the selected state, setting the session members select-all interactive option to the unselected state.

6. The method according to claim 1, wherein the determining whether the adding all the members of the session as the participants of the task is restricted comprises at least one of:

if the maximum number of participants allowed to be set for the task is less than the number of the session members, determining that the adding all the members of the session as the participants of the task is restricted, the displayed session member list of the session comprising all the members of the session;

or, if the session is only allowed to display part of the members, determining that the adding all the members of the session as the participants of the task is restricted, the displayed session member list of the session comprising only the part of the members of the session.

7. The method according to claim 1, wherein the in response to the operation of creating the task in the session, displaying the task creation interface in the session interface, comprises one or more of:

in response to a message-to-task operation, creating the task in the session;

in response to an operation of triggering a task creation control in a message input box, creating the task in the session; and in response to an operation of triggering a task creation control in a session sidebar, creating the task in the session.

8. The method according to claim 1, wherein the task participants are: task executors or task followers.

9. An electronic device, comprising:

one or more processors; and a storage configured to store one or more programs, the one or more programs, when executed by the one or more processors, causing the one or more processors to implement a method for adding task participants in an application, comprising:

in response to receiving an interactive operation of creating a task in a session, displaying a task creation interface in a session interface, the task creation interface comprising a task participant adding interactive option, wherein the session interface and the task creation interface are both graphical user interfaces (GUIs);

in response to receiving a selection operation on the task participant adding interactive option, displaying a session members select-all interactive option, and further displaying a session member list of the session; and in response to receiving a selection operation on the session members select-all interactive option, adding all members of the session as participants of the task, and displaying a selected state of the session members select-all interactive option, and further displaying a selected state of all the members in the session member list, wherein the in response to receiving the selection operation on the task participant adding interactive option, displaying the session members select-all interactive option, and further displaying the session member list of the session, comprises:

in response to receiving the selection operation on the task participant adding interactive option, if adding all the members of the session as the participants of the task is not restricted, displaying the session members select-all interactive option and the session member list of the session, the session members select-all interactive option being in a selectable state, and the session member list of the session comprising all the members of the session; or if adding all the members of the session as the participants of the task is restricted, either not displaying the session members select-all interactive option, or displaying the session members select-all interactive option in an unselectable state; and displaying the session member list of the session.

10. A non-transitory computer-readable storage medium having thereon stored a computer program which, when executed by a processor, implements a method for adding task participants in an application, comprising:

in response to receiving an interactive operation of creating a task in a session, displaying a task creation interface in a session interface, the task creation interface comprising a task participant adding interactive option, wherein the session interface and the task creation interface are both graphical user interfaces (GUIs);

in response to receiving a selection operation on the task participant adding interactive option, displaying a session members select-all interactive option, and further displaying a session member list of the session; and in response to receiving a selection operation on the session members select-all interactive option, adding all members of the session as participants of the task, and displaying a selected state of the session members select-all interactive option, and further displaying a selected state of all the members in the session member list, wherein the in response to receiving the selection operation on the task participant adding interactive option, displaying the session members select-all interactive option, and further displaying the session member list of the session, comprises:

in response to receiving the selection operation on the task participant adding interactive option, if adding all the members of the session as the participants of the task is not restricted, displaying the session members select-all interactive option and the session member list of the session, the session members select-all interactive option being in a selectable state, and the session member list of the session comprising all the members of the session; or if adding all the members of the session as the participants of the task is restricted, either not displaying the session members select-all interactive option, or displaying the session members select-all interactive option in an unselectable state; and displaying the session member list of the session.

11. The electronic device according to claim 9, after the in response to the selection operation on the session members select-all interactive option, adding all the members of the session as the participants of the task, and displaying the selected state of the session members select-all interactive option, further comprising:

in response to a deselection operation on part of the members in the session member list, canceling adding the part of the members as the participants of the task, and displaying an unselected state of the part of the members in the session member list.

12. The electronic device according to claim 9, wherein the one or more programs, when executed by the one or more processors, cause the one or more processors to implement steps of at least one of:

updating a task participant list based on any one of the selection operation or a deselection operation on the session members select-all interactive option; or, updating the task participant list based on any one of a selection operation or a deselection operation on each member in the session member list of the session, the task participant list being used for collectively displaying all participants added.

13. The electronic device according to claim 12, wherein in the task participant list, information of one same participant occupies only one display position.

14. The electronic device according to claim 12, wherein the one or more programs, when executed by the one or more processors, cause the one or more processors to implement steps of:

determining whether all members of current session appear in the task participant list;

if all the members of the current session appear in the task participant list and the session members select-all interactive option is in an unselected state, setting the session members select-all interactive option to the selected state; and if only part of the members of the current session appear in the task participant list and the session members select-all interactive option is in the selected state, setting the session members select-all interactive option to the unselected state.

15. The electronic device according to claim 9, wherein the determining whether the adding all the members of the session as the participants of the task is restricted comprises at least one of:

if the maximum number of participants allowed to be set for the task is less than the number of the session members, determining that the adding all the members of the session as the participants of the task is restricted, the displayed session member list of the session comprising all the members of the session;

or, if the session is only allowed to display part of the members, determining that the adding all the members of the session as the participants of the task is restricted, the displayed session member list of the session comprising only the part of the members of the session.

16. The electronic device according to claim 9, wherein the in response to the operation of creating the task in the session, displaying the task creation interface in the session interface, comprises one or more of:

in response to a message-to-task operation, creating the task in the session;

in response to an operation of triggering a task creation control in a message input box, creating the task in the session; and in response to an operation of triggering a task creation control in a session sidebar, creating the task in the session.

* * * * *